United States Patent
Farinelli et al.

(10) Patent No.: US 11,017,774 B2
(45) Date of Patent: May 25, 2021

(54) COGNITIVE AUDIO CLASSIFIER

(71) Applicant: International Business Machines Corporation, Armonk, NY (US)

(72) Inventors: Kristi A. Farinelli, Philadelphia, PA (US); Rahul P. Akolkar, Austin, TX (US); Brian E. Bissell, Fairfield, CT (US); Joseph L. Sharpe, III, Waxhaw, NC (US); Stefan van der Stockt, Austin, TX (US); Xinyun Zhao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/266,591

(22) Filed: Feb. 4, 2019

(65) Prior Publication Data
US 2020/0251115 A1    Aug. 6, 2020

(51) Int. Cl.
*G10L 15/26* (2006.01)
*G10L 17/22* (2013.01)
*G06N 3/063* (2006.01)

(52) U.S. Cl.
CPC .............. *G10L 15/26* (2013.01); *G06N 3/063* (2013.01); *G10L 17/22* (2013.01)

(58) Field of Classification Search
None
See application file for complete search history.

(56) References Cited

U.S. PATENT DOCUMENTS

| 8,423,361 | B1 | 4/2013 | Chang et al. |
| 9,374,629 | B2 | 6/2016 | Lee |
| 9,607,615 | B2 | 3/2017 | Han et al. |
| 9,666,183 | B2 | 5/2017 | Visser et al. |
| 9,842,605 | B2 | 12/2017 | Lu et al. |

(Continued)

FOREIGN PATENT DOCUMENTS

EP    2579256 B1    5/2017

OTHER PUBLICATIONS

Lu et al.; "Content Analysis For Audio Classification And Segmentation", IEEE Transactions On Speech And Audio Processing, vol. 10, No. 7, Oct. 2002, pp. 504-516.

(Continued)

*Primary Examiner* — Yogeshkumar Patel
(74) *Attorney, Agent, or Firm* — Terrile, Cannatti & Chambers, LLP; Michael Rocco Cannatti

(57) ABSTRACT

A method, system, and computer program product are provided for classifying spoken audio content with a cognitive audio classifier by applying a set of distorted audio resources through a set of speech-to-text models STTi (STT1 . . . STTn) to get a set of interference coherence scores based on the transcript for each speech-to-text model STTi, thereby generating a measured baseline Mi (M1 . . . Mn) and a practical baseline Pi (P1 . . . Pn) that is associated with a coherence matrix for the audio effects AEj (AE1 . . . AEk) that were used to generate the distorted audio resources, thereby generating training data for use in training a cognitive audio classifier which classifies input spoken audio content to measure a quality of detected vocabulary elements from the spoken audio content under the set of audio distortion effects for each speech-to-text model STTi.

20 Claims, 5 Drawing Sheets

(56) References Cited

U.S. PATENT DOCUMENTS

| | | | |
|---|---|---|---|
| 9,865,249 B2 | 1/2018 | Talwar et al. | |
| 2005/0143971 A1 | 6/2005 | Burstein et al. | |
| 2007/0083365 A1 | 4/2007 | Shmunk | |
| 2011/0207099 A1* | 8/2011 | Chen | A61B 5/4803 |
| | | | 434/236 |
| 2014/0278391 A1 | 9/2014 | Braho et al. | |
| 2015/0279427 A1 | 10/2015 | Godfrey et al. | |
| 2016/0322066 A1 | 11/2016 | Sharifi et al. | |
| 2018/0025732 A1 | 1/2018 | Lepauloux et al. | |
| 2018/0329982 A1* | 11/2018 | Patel | G06F 16/3322 |
| 2020/0175962 A1* | 6/2020 | Thomson | G10L 15/183 |

OTHER PUBLICATIONS

Kim et al.; "Supervised Acoustic Topic Model With A Consequent Classifier For Unstructured Audio Classification," CBMI IEEE 10th Inter. Conf. On, Jun. 27-29, 2012, pp. 1-6.

Ravanelli et al.; "Audio Concept Classification With Hierarchical Deep Neural Networks," EUSIPCO IEEE 22nd European Conference On, Sep. 1-5, 2014, pp. 606-610.

Andersson, Tobias; "Audio Classification And Content Description," Lulea University Of Technology, Master Thesis, Mar. 2004, pp. 1-63.

Jonathan T. Foote, "Content-Based Retrieval of Music and Audio," SPIE Proceedings, vol. 3229, Oct. 6, 1997 https://pdfs.semanticscholar.org/b8d0/95817c230cabd01b1bd4de959689cf33da83.pdf.

Françoise Beaufays, Google AI Blog, "The Neural Networks Behind Google Voice Transcription," Aug. 11, 2015.

Alex Graves et al., "Speech Recognition with Deep Recurrent Neural Networks," IEEE International Conference on Acoustics, Speech and Signal Processing, May 26-31, 2013.

Jaap Haitsma et al., "Robust Audio Hashing for Content Identification," Content-Based Multimedia Indexing (CBMI), 2001.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

COGNITIVE AUDIO CLASSIFIER

BACKGROUND OF THE INVENTION

In the field of artificially intelligent computer systems, cognitive question answering (QA) systems (such as the IBM Watson™ artificially intelligent computer system or and other natural language question answering systems) are capable of processing questions posed in natural language to determine answers and associated confidence scores based on knowledge acquired by the QA system. For purposes of evaluating the meaning of a submitted question and/or assessing documents for ingestion into a corpus, text inputs can be classified to understand the intent behind the text by applying cognitive computing techniques (e.g., custom intent models) to return best matching predefined classes corresponding to the text inputs. In similar fashion, images can be processed with custom training to classify an image and extract image features for use in further processing. It is also possible to extract text from speech recognition, even with custom speech models. However, there are no existing solutions for cognitively assessing audio information by extracting features from sound and otherwise classifying audio or sound information. While certain audio classification systems have been proposed, such schemes do not disclose techniques for cognitively assessing audio or sound information for quality and/or coherence. As a result, the existing solutions for efficiently and accurately classifying audio content are extremely difficult at a practical level.

SUMMARY

Broadly speaking, selected embodiments of the present disclosure provide a system, method, and apparatus with a cognitive audio classifier which uses audio features and metadata to dynamically analyze the content and quality of audio information. In selected embodiments, an information handling system embodied as a cognitive computing system may implement a learning phase which uses an audio transcript and a variety of different distorted training audio resources (e.g., audio inputs from different devices and sources) with human-labeled quality levels to train a cognitive assessment model, such as a long short-term memory (LSTM) neural network, to perform speech or audio recognition. Each audio resource is applied through a set of speech-to-text models and a discourse analysis model to measure and score the coherence of the audio resource for use in identifying "hard to comprehend" words that can be used to train the cognitive assessment model. For example, a first "clear" audio resource is applied through speech-to-text models (e.g., STT1, STT2, etc.) to get a "clear" (undistorted) coherence measurement and score for each model (e.g., STTi) as the measured baseline (e.g., M1, M2, etc.). In addition, distorted audio resources are labeled by distortion type and applied through the speech-to-text models (e.g., STT1, STT2, etc.) to get a distorted coherence measurement and score for each model (e.g., STTi) as a practical baseline (P1, P2, etc.) that is associated with a coherence matrix for the audio effects (e.g., AE1, AE2, etc.) that were used to generate the distorted audio. Practical baseline measurements and scores from the "clear" and distorted audio provide training data for the cognitive assessment model. The quality of various vocabulary elements may be measured by the cognitive audio classifier during runtime operations under different audio distortion effects (e.g., noise conditions, connection conditions, recording quality) for each STT model. For example, the cognitive assessment model may employ any suitable machine learning technique (e.g., deep learning services, database join operations, LSTM neural network, etc.) which is trained to rank multiple speech-to-text models under varying audio distortion types to continually select the most accurate model at time t. The coherence score of each distortion's transcript is compared against that of the ideal transcript to identify "hard to comprehend" words for each STT model under each type of distortion. The output is a comprehensibility index that tracks which STT model has difficulty with which words under which conditions, and that is used at runtime to select the most optimal model at time t, given any particular distortion. In addition, the information handling system may use the trained cognitive assessment model to create a classification pipeline which uses services (e.g., Speech to Text, Text to Speech and other Deep Learning services, such as LSTM recurrent neural networks) to implement an audio classifier during runtime operations. During runtime, a candidate audio file is processed by the classification pipeline to generate scores for each feature and to output the classified label based on the ranking model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
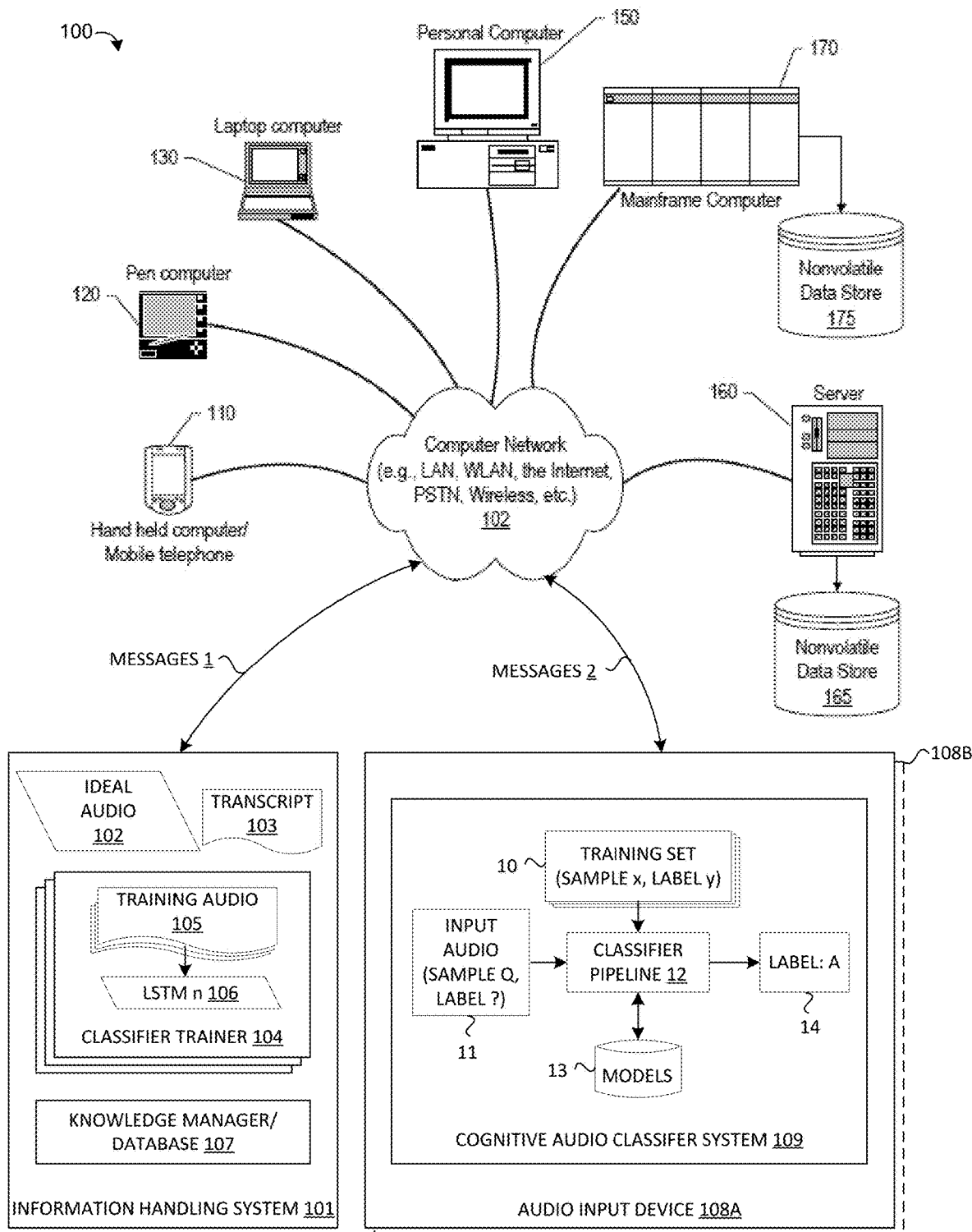
FIG. 1 depicts a network environment that includes an information handling system for training a cognitive audio classifier and an audio input device which uses a trained cognitive audio classifier to dynamically analyze audio in accordance with selected embodiments of the present disclosure.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a network environment 100 that includes an information handling system 101 for training a cognitive audio classifier and one or more audio input devices 108 which each use a trained cognitive audio classifier 109 to dynamically analyze audio. Though not shown, it will be appreciated that the information handling system 101 may include a knowledge database that is connected to a knowledge manager having one or more processors configured to provide cognitive computing functionality for implementing one or more classifier trainers 104 which each apply training audio 105 to train one or more cognitive audio classification models 106, such as a long short-term memory (LSTM) neural network, to perform speech or audio classification. While any suitable cognitive audio classification model may be used, there are advantages for using an LSTM model which provides the ability to record invariant pattern from large data set. In addition, LSTM models can be used to learn from experience to process time series when long time lags occur between important events, such as can arise between segments of speech. Another advantage of LSTM models is that the total error can be propagated back to each layer within the network effectively, which is helpful for the long term online learning. In operation, the information handling system 101 is configured to provide input training audio 105 as a variety of different speech or audio resources having a specified quality level to train each LSTM classifier 106. For example, in order to predict a candidate audio quality with a numerical value from 0 to 9, ten groups of training audio files 105 with different quality levels are prepared from an ideal audio input 102 having an associated transcript 103 so that the files in each group have the same quality level but with different content of speech and other features. At the classifier trainer 104, the ten different groups of training audio files 105 are fed into ten individual cognitive audio classification models 106 (e.g., LSTM 1-10) for training where the transcripts 103 are used for error correction. With this training, the LSTM model 106 will provide high quality speech recognition on the specified quality level of audio source. When embodied with one or more deep learning services or other suitable machine learning techniques, the classifier trainer 104 may train the LSTM model 106 by ranking speech-to-text model outcomes using the training audio resources 105 (A1, A2, etc.), where each audio resource Ai has a quality Qi and a similarity metric Sij for associating audio resources Ai, Aj, and then using a coherence vector to identify a type of audio effect affecting the speech-to-text.

Once trained, the cognitive audio classifier models 106 may be stored in a database 13 at one or more audio input devices 108 for use by the cognitive audio classifier 109 which uses a classifier pipeline 12 to dynamically analyze input audio 11 and generate therefrom output labels 14. In addition or in the alternative, the cognitive audio classifier system 109 may be continually updated by receiving training set input data 10 in the form of paired samples and associated quality labels. During testing operations, the classifier pipeline 12 receives an input audio file 11 (e.g., Sample Q) that is not labelled. For example, the user of the audio input device 108A may dictate a paragraph or phrase into a microphone for recording as a test audio file. As described more fully hereinbelow, the input audio file 11 is processed at the classifier pipeline 12 which includes multiple speech recognition modules (e.g., LSTM speech-to-text models) and paired discourse evaluation modules to derive and evaluate the speech content for coherency. By comparing the speech content/coherency outcomes with the ground truth text for the input audio file 11, the classifier pipeline 12 ranks the speech text to select the top-most result, and then outputs a label 14 (e.g., A) based on correspondence with the training data 10. In selected embodiments, the classifier pipeline 12 is configured to map the speech text back to the related LSTM STT module and then use the corresponding module's rank as the quality level that is output as the label 14 (e.g., "good" or "bad") for the input audio 11.

As disclosed herein, the information handling system 101 and/or audio input device(s) 108 may each be embodied as computing device (having one or more processors and one or more memories, and potentially any other computing device elements generally known in the art including buses, storage devices, communication interfaces, and the like) for processing messages 1, 2 from one or more users at computing devices (e.g., 110, 120, 130) connected over the network 102 for communication with each other and with other devices or components via one or more wired and/or wireless data communication links, where each communication link may comprise one or more of wires, routers, switches, transmitters, receivers, or the like. In this networked arrangement, the information handling system 101 and/or audio input device(s) 108 may enable question/answer (QA) functionality for one or more content users. Other embodiments of the information handling system 101 and/or audio input device(s) 108 may be used with components, systems, sub-systems, and/or devices other than those that are depicted herein. In addition, some or all of the inputs to the information handling system 101 and/or audio input device(s) 108 may be routed through the network 102. The various computing devices (e.g., 110, 120, 130) on the network 102 may include access points for content creators and content users. The network 102 may include local network connections and remote connections in various embodiments, such that the network 100 may represent a network environment of any size, including local and global, e.g., the Internet.

In selected embodiments, the cognitive audio classifier system 109 provides a supervised approach for extracting noise features from input audio, and then supplying the extracted features and metadata at a cognitive audio classifier to dynamically analyze audio information. To this end, a plurality of different audio resources having human-labeled quality levels is used to train a speech recognition module (e.g., an LSTM model). At each speech recognition module, the input audio resources have a shared quality level but other different audio features, such as vocal traits, languages, bit rate, genre, etc. After training a specified number of speech recognition modules to match the exact amount of levels, the cognitive audio classifier system 109 may be used to test or assess input audio 11 by supplying the audio to speech recognition modules in the classifier pipeline 12 which generates output speech text and ranks these outcomes to choose the top one as the predicted quality level.

Each of the information handling system 101 and/or audio input device(s) 108 can be embodied in computer systems that range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
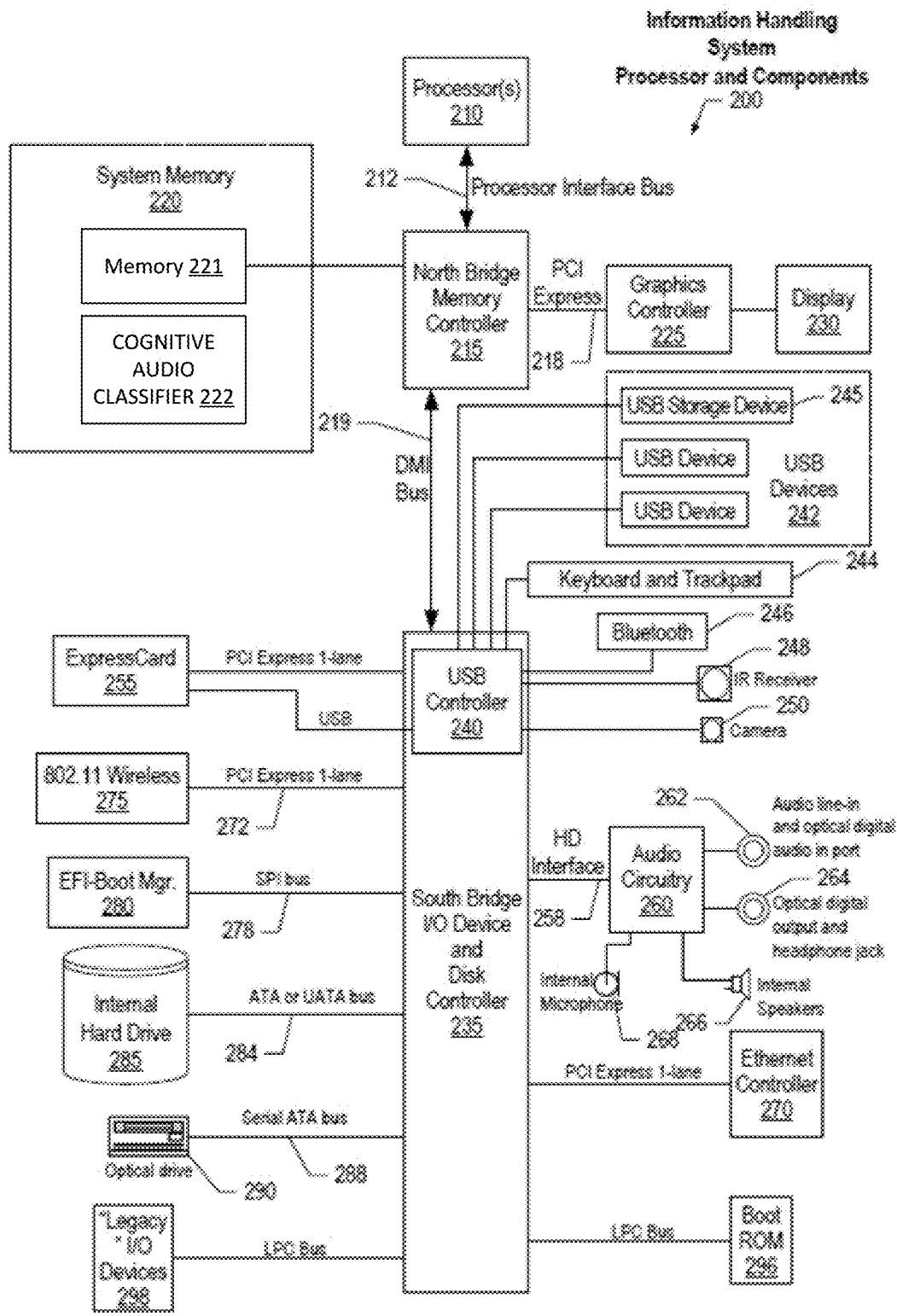
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices 221, including a cognitive audio classifier module 222 which may be invoked to dynamically analyze audio information from an input audio file based on extracted audio feature and metadata that is applied to a cognitive audio classifier. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
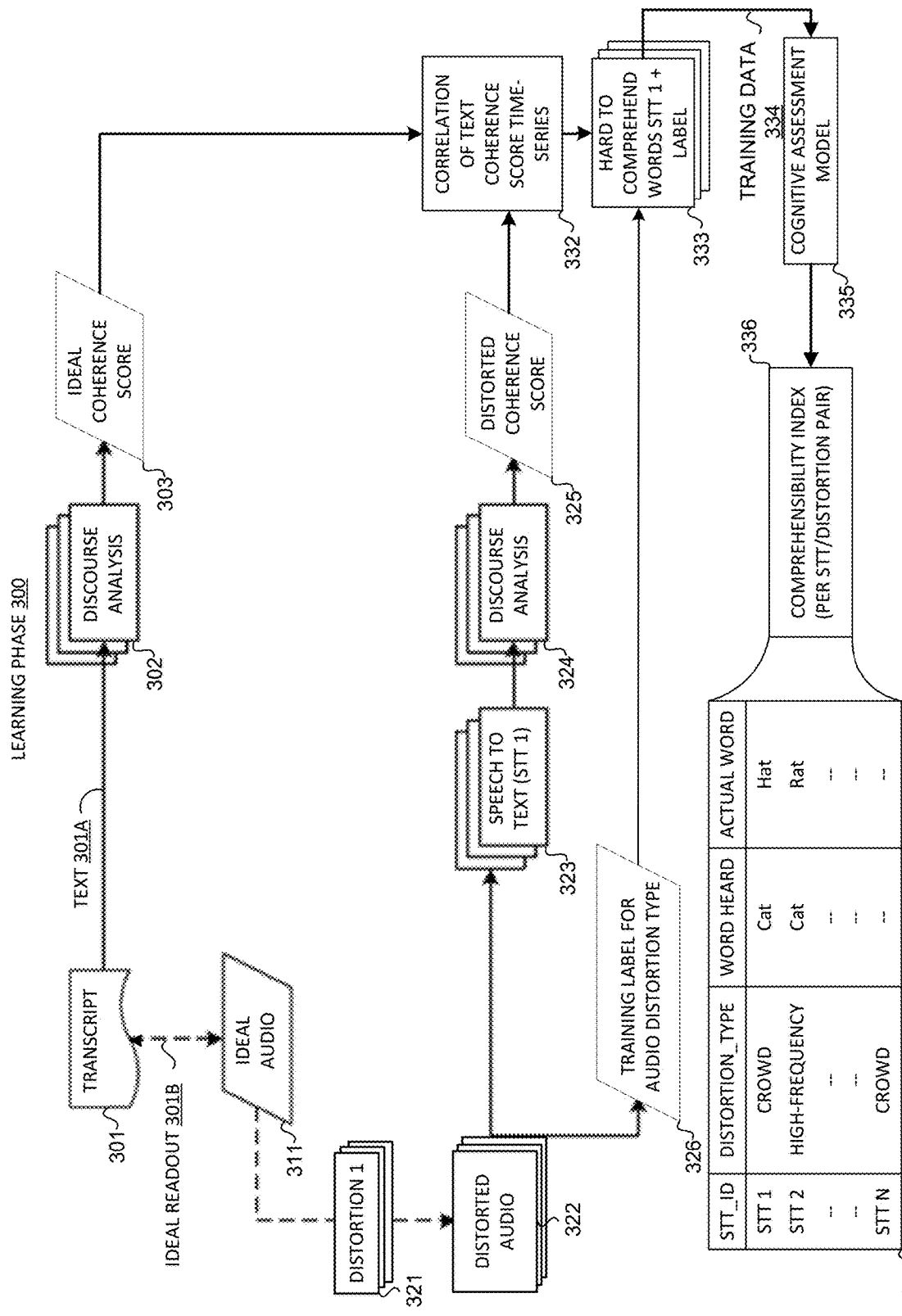
FIG. 3 illustrates a learning phase for training a cognitive assessment model with different permutations of audio inputs, speech-to-text models, and discourse models to find the best performing combinations in accordance with selected embodiments of the present disclosure.

To provide additional details for an improved understanding of selected embodiments of the present disclosure, reference is now made to FIG. 3 which diagrammatically illustrates a learning phase methodology and system 300 for training a cognitive assessment model 335 with different permutations of audio inputs 311, 322, speech-to-text models 323, and discourse models 302, 324 to find the best performing combinations. The processing shown in FIG. 3 is performed by a cognitive system, such as an IBM Watson™ QA system or other information handling system 101 shown in FIG. 1. In the depicted learning phase 300, an "ideal" input audio resource or file 311 is used to generate a corresponding transcript 301, or vice versa. For example, the transcript 301 may be used to provide the text output 301A and to record an ideal readout 301B as the ideal audio 311. In addition, the ideal audio 311 may be used to generate one or more distorted audio versions 322, such as by applying audio distortion transforms 321 (e.g., Distortion 1-Distortion n) to generate different distorted audio resources 322. Examples of distortion transforms 321 may include lossy transforms, noisy transforms, audio modification transforms to increase or lower the volume, or the like.

With the transcript 301, "clear" audio resource 311, and distorted audio resource(s) 322, the learning phase 300 uses a "baseline" processing path 301-303 and a distortion processing path 322-325 to measure the coherence of the distorted audio input sources 322 in order to generate training data for the cognitive assessment model 335. In the baseline processing path, each training transcript 301A is first analyzed using discourse analysis 302 to provide the ideal coherence score 303 as a baseline. And in the distortion processing path, each training example's original (ideal) audio signal is transformed using J specific types of audio distortions 321. One of these distortions includes "studio quality" identity transform, which means no extra distortion is added. The discourse analysis 324 is repeated on each of these J variations to yield J coherence scores for the J audio variations. This process is repeated for each of the K speech to text models 323, yielding K×J coherence scores 325. Applying a correlation analysis 332, the K×J coherence scores 325 of each type of distortion and each type of speech to text model are then compared to the ideal coherence scores 303 generated from the baseline performance of each respective speech to text model to determine "hard to comprehend" words 333 (for each of the K models and each of the J distortion types). The output of this correlation analysis 332 serves as training data 334 for the cognitive assessment model 335, which in turn produces a "comprehensibility index" 336 that captures which speech-to-text model (e.g., STT 1) has difficulty comprehending what words (e.g., "Cat") under which audio distortion types (e.g., "Crowd" distortion type).

In connection with a third processing path, training labels 326 are generated for each audio distortion type so that each distorted audio resource 322 has an associated label. As will be appreciated, different methods may be applied to generate the training labels 326, including but not limited to using humans to generate labels 326 and/or training a recurrent neural networks (RNN) to generate labels 326 for each distorted audio resource 322.

Using the coherence scores 303, 325, the learning phase 300 generates training data 334 for the cognitive assessment model 335. For example, a baseline tuning threshold may be applied to the coherence scores 303, 325 to generate training data permutations by evaluating different combinations of STT and discourse models to identify the best performing combinations of audio resources, STT models, and discourse models. While any suitable computation technique may be used to generate the training data, selected embodiments of the present disclosure use the ideal coherence score 303 and the distorted coherence scores 325 as vector values to compute a correlation measure of the text coherence score time-series 332 based on the STT audio transcript from the STT models 323. After applying a filter to the correlation results 332, a paired list 333 is generated of hard-to-comprehend words associated with each STT model 323, and then combined with the corresponding training labels for corresponding distortion types 326 to generate the training data 334.

Once trained with the training data 334, the cognitive assessment model 335 may be configured to generate a listing of STT-discourse model pairs, along with a cognitive assessment scoring model and associated discourse scores. For example, the cognitive assessment model 335 may generate a comprehensibility index 336 for each paired STT model and distortion model. In the depicted example, an indexed table 337 provides an example of a comprehensibility index 336 which lists STT-Distortion model pairs (STT_ID, DISTORTION_TYPE) and corresponding "actual" and "heard" text words. In the example indexed table 377, there is listed a first STT-discourse model pair (STT1, Crowd) associated with the "hard to comprehend" word "Cat" and the "actual" word "Hat." The indexed table 337 also lists a second STT-discourse model pair (STT2, High-Frequency) associated with the "hard to comprehend" word "Cat" and the "actual" word "Rat," and so on.

The learning phase processing 300 may be performed at information handling system 101 or other cognitive system capable of providing services, such as Natural Language Processing, Speech to Text, Text to Speech, Deep Learning (e.g., LSTM recurrent neural networks), or other machine learning services. As described herein, a Natural Language Processing (NLP) routine may be used to perform deep NLP analysis on the question request, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. In addition, a Speech to Text service may be used to convert audio and voice into written text in one or more specified languages. Conversely, a Text to Speech service may be used to convert written text into natural-sounding audio. And as understood by those skilled in the art, a Deep Learning service (also known as deep structured learning or hierarchical learning) is part of a broader family of machine learning methods based on learning data representations from training data examples.

Figure 4:
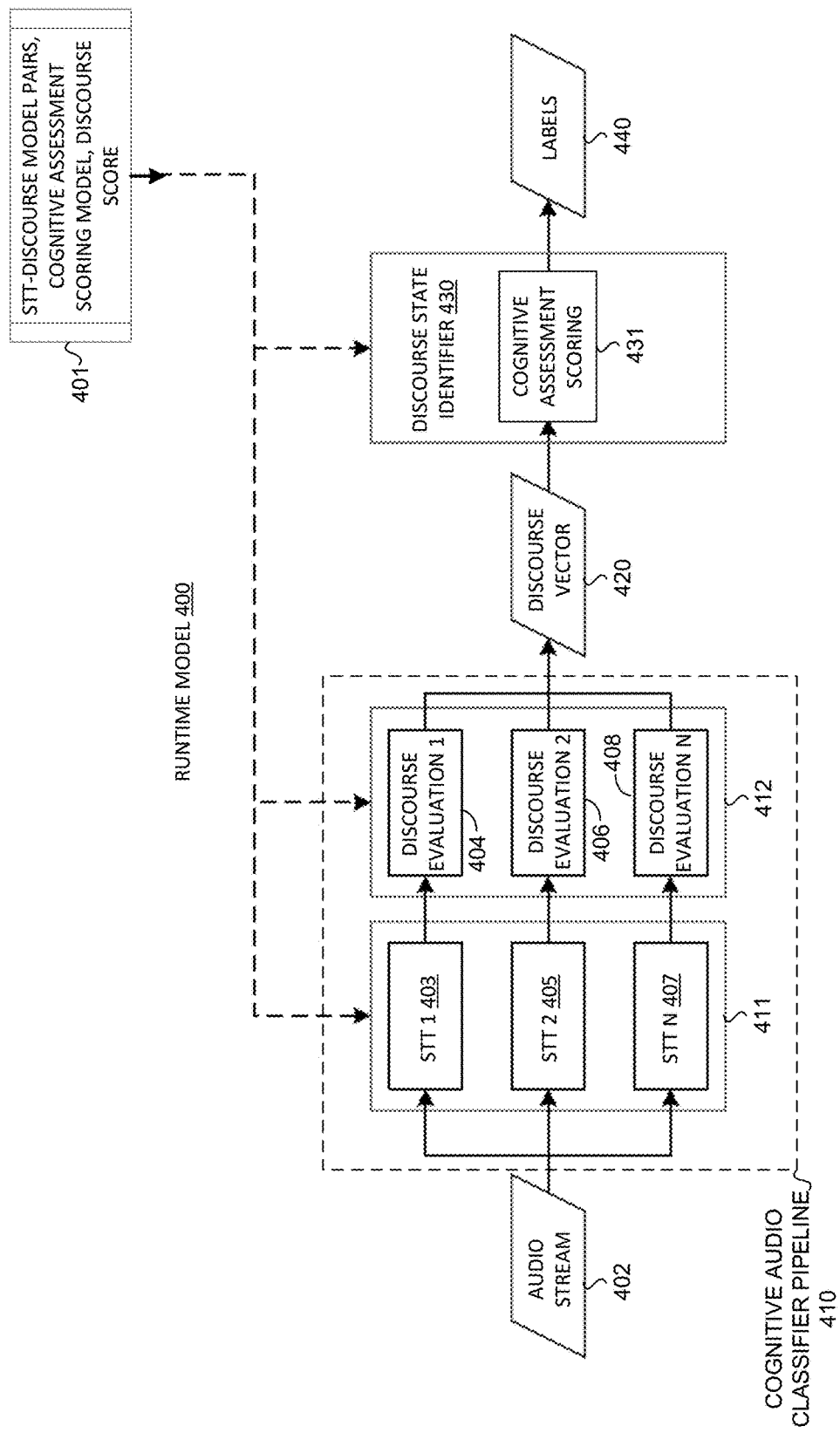
FIG. 4 illustrates a simplified cognitive audio classifier runtime model in which the cognitive assessment model is embodied in a classification pipeline in accordance with selected embodiments of the present disclosure.

To provide additional details for an improved understanding of selected embodiments of the present disclosure, reference is now made to FIG. 4 which diagrammatically illustrates a runtime model methodology and system 400 for dynamically analyzing or testing an input audio stream 402 with a cognitive audio classification pipeline 410 which generates scores for one or more extracted audio features for use in outputting a classified label 440 based on the ranking model. The processing shown in FIG. 4 may be performed by a cognitive system, such as an IBM Watson™ QA system or other audio input device 108 shown in FIG. 1. In the depicted runtime model 400, an input test audio stream 402 is provided to the cognitive audio classifier pipeline 410. For example, the user of the audio input device 108A may dictate a paragraph or phrase into a microphone for recording as the input test audio file 402. As received, the input test audio stream 402 (e.g., Sample Q) is not labelled to identify the sound quality.

At the cognitive audio classifier pipeline 410, the input test audio stream 402 is processed with machine learning classification techniques to derive and evaluate the speech content for coherency. To this end, the cognitive audio classifier pipeline 410 may also be connected to receive input training data 401, such as STT-discourse model pairs, cognitive assessment scoring model data, and discourse scores generated by the learning phase 300. In selected embodiments, the cognitive audio classifier pipeline 410 may include a plurality of speech recognition modules 411 and a corresponding plurality of discourse models 412 which are connected in sequence to pipeline the processing of the input test audio stream 402 in parallel and generate therefrom an output discourse vector 420 corresponding to the input test audio stream 402. For example, the plurality of speech recognition modules 411 may include a plurality of speech-to-text models 403, 405, 407 (STT1-$n$) connected in parallel to generate output text from the received input test audio stream 402. While any suitable speech-to-text model may be used, there are a number of performance advantages from using long short-term memory (LSTM) speech recognition modules 403, 405, 407 to extract the speech content in text form. However generated, the extracted text outputs from the speech recognition modules 411 may be processed by a corresponding plurality of discourse evaluation models 404, 406, 408 (Discourse Evaluation 1-*n*) which are connected in parallel to generate coherence measures that are combined to form the discourse vector 420. Using the cognitive assessment scoring data 431 generated by the learning phase 300, the discourse state identifier module 430 compares the speech content/coherency outcomes identified in the discourse vector 420 with the ground truth text for the input test audio stream 402 to rank the speech text to select the top-most result as the identified discourse state, and then outputs the identified discourse state as a label 440 based on correspondence with the training data 401. In selected embodiments, the discourse state identifier module 430 is configured to map the speech text back to the related LSTM STT model 403, 405, 407 and then use the corresponding model's rank as the quality level that is output as the label 440 (e.g., "good" or "bad") for the input audio 402.

Figure 5:
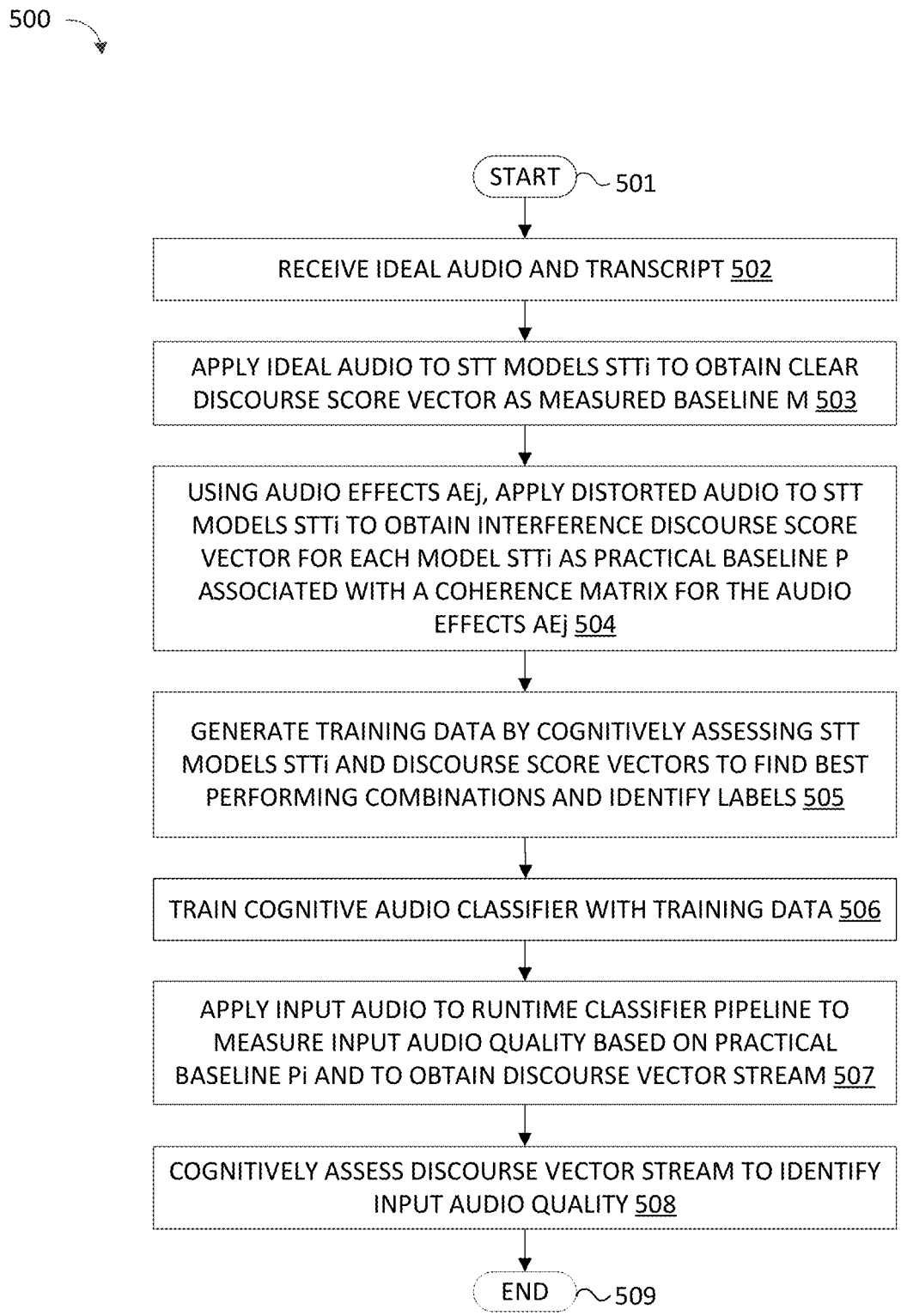
FIG. 5 illustrates a simplified flow chart showing the logic for dynamically analyzing audio information with a cognitive audio classifier in accordance with selected embodiments of the present disclosure.

To provide additional details for an improved understanding of selected embodiments of the present disclosure, reference is now made to FIG. 5 which depicts a simplified flow chart showing the logic for dynamically analyzing audio information with a cognitive audio classifier. The processing shown in FIG. 5 is performed to train and use a cognitive audio classifier by a cognitive system, such as an IBM Watson™ QA system or other natural language question answering system shown in FIG. 1. The disclosed processing methodology 500 commences at 501 whereupon, at step 502, an ideal audio and associated transcript is received. The processing at step 502 may be performed at the information system 101 or other cognitive computing system which is configured to receive a transcript and generate therefrom an audio file or vice versa.

At step 503, the ideal audio is applied to a plurality of speech-to-text models STTi (e.g., STT1, STT2, . . . STTn) and a discourse analysis model to obtain a clear discourse score vector as a measured baseline M (M1, M2, . . . Mn) of the coherence of the ideal audio. The processing at step 503 may be performed at the Classifier Trainer 104 (FIG. 1) or other information handling system which provides services, such as Speech to Text, Text to Speech and other Deep Learning services, including LSTM recurrent neural networks. For example, one or more cognitive services may be applied to extract features and/or metadata from the ideal audio which are used to apply the audio resource through speech-to-text models so that a discourse analysis may be applied to measure and score the coherence of the audio resource. In particular, a first "clear" audio resource is applied through speech-to-text models (e.g., STT1, STT2, etc.) to get a "clear" (undistorted) coherence measurement and score for each model (e.g., STTi) as the measured baseline (e.g., M1, M2, etc.).

At step 504, the ideal audio is distorted by applying audio effects (AEj) to generate a plurality of distorted audio resources so that each distorted audio is applied to the plurality of speech-to-text models STTi (e.g., STT1, STT2, . . . STTn) and a discourse analysis model to obtain an interference discourse score vector as a practical baseline P (P1, P2, . . . Pn) that is associated with a coherence matrix for the audio effects AEj. The processing at step 504 may be performed at the Classifier Trainer 104 (FIG. 1) or other information handling system which provides services, such as Speech to Text, Text to Speech and other Deep Learning services, including LSTM recurrent neural networks. For example, one or more cognitive services may be applied to extract features and/or metadata from the distorted audio which are used to apply the distorted audio resource through speech-to-text models so that a discourse analysis may be applied to measure and score the coherence of the distorted audio resource. In particular, distorted audio resources are labeled by distortion type and applied through the speech-to-text models (e.g., STT1, STT2, etc.) to get a distorted coherence measurement and score for each model (e.g., STTi) as a practical baseline (P1, P2, etc.) that is associated with a coherence matrix for the audio effects (e.g., AE1, AE2, etc.) used to generate the distorted audio.

At step 505, training data is generated from the STT models and discourse score vectors by cognitively assessing the STT models STTi and discourse score vectors to find the best performing combinations with associated labels. The processing at step 505 may be performed at the Classifier Trainer 104 (FIG. 1) or other information handling system which provides cognitive services, such as Natural Language Processing services, to generate training data. For example, the training data may be generated by applying a baseline tuning threshold to the coherence scores in the discourse score vectors to generate training data permutations by evaluating different combinations of STT and discourse models to identify the best performing combination s of audio resources, STT models, and discourse models. In addition or in the alternative, the training data may be generated by computing a time series correlation of the text coherence scores on the basis of a reference transcript (e.g., STT audio or distorted audio coherence) to identify "hard to comprehend" words that are paired with associated STT model type, distortion label, and discourse score.

At step 506, the training data is used to train the cognitive audio classifier. The processing at step 506 may be performed at the Cognitive Audio Classifier System 109 (FIG. 1) or other information handling system where a training dataset is applied using any suitable machine learning techniques. For example, a plurality of LSTM modules arranged in an audio classifier pipeline may each be trained by applying a variety of distorted speech audio resources with human labeled noise levels having a specified quality level so that each LSTM module can accurately perform speech recognition at the specified quality level.

At step 507, a candidate input audio is applied to the runtime classifier pipeline to measure the input audio quality based on the practical baseline P and to obtain the corresponding discourse vector stream which provides a measure of the coherency of the input audio. The processing at step 507 may be performed at the Cognitive Audio Classifier System 109 (FIG. 1) or other information handling system where the cognitive audio classifier may be run to classify the input audio. In selected embodiments, the processing at step 507 may use the practical baseline measurements and scores (P1, P2, etc.) to measure the quality of various vocabulary elements in the input audio under different audio distortion effects (e.g., noise conditions, connection conditions, recording quality) for each STT model.

At step 508, the discourse vector stream is cognitively assessed to identify the input audio quality based on the output label generated by the runtime classifier pipeline. The processing at step 508 may be performed at the Cognitive Audio Classifier System 109 (FIG. 1) or other information handling system where the cognitive audio classifier may be run to classify the input audio with a label.

By now, it will be appreciated that there is disclosed herein a system, method, apparatus, and computer program product for classifying spoken audio content based on audio features and metadata using an information handling system having a processor and a memory. As disclosed, the system, method, apparatus, and computer program product receive a baseline audio resource and associated transcript. By applying a set of audio distortion effects AEj (AE1, AE2, ... AEk) to the baseline audio resource, a set of distorted audio resources is generated. In selected embodiments, the baseline audio resource and spoken audio content are processed to extract audio features and metadata. The baseline audio resource is applied through a set of speech-to-text models STTi (STT1, STT2, ... STTn) to get a clear coherence score based on the transcript for each speech-to-text model STTi as a measured baseline Mi (M1, M2, ... Mn). In selected embodiments, outputs from the set of speech-to-text models STTi (STT1, STT2, ... STTn) are processed with a discourse analysis model to get the clear coherence score for each speech-to-text model STTi as the measured baseline Mi (M1, M2, ... Mn). In addition, each distorted audio resource is applied through the set of speech-to-text models STTi (STT1, STT2, ... STTn) to get an interference coherence score based on the transcript for each speech-to-text model STTi as a practical baseline Pi (P1, P2, ... Pn) that is associated with a coherence matrix for the audio effects AEj (AE1, AE2, ... AEk) that were used to generate the distorted audio resources. In selected embodiments, outputs from the set of speech-to-text models STTi (STT1, STT2, ... STTn) are processed with a discourse analysis model to get the interference coherence score for each speech-to-text model STTi as the practical baseline Pi (P1, P2, ... Pn). Using the measured baseline Mi (M1, M2, ... Mn) and practical baseline Pi (P1, P2, ... Pn), training data is generated for use in training a cognitive audio classifier. In selected embodiments, the cognitive audio classifier includes a plurality of long short-term memory (LSTM) neural network classifiers, each of which is trained with the practical baseline Pi (P1, P2, ... Pn) from the set of distorted audio resources which have a common quality level, such as a human labeled noise level for each distorted audio resource. In other embodiments, the cognitive audio classifier includes a deep learning service that is trained by ranking outcomes of speech-to-text models STTi using the interference coherence scores generated from the set of distorted audio resources. Finally, spoken audio content is applied to the cognitive audio classifier to measure a quality of detected vocabulary elements from the spoken audio content under the set of audio distortion effects for each speech-to-text model STTi. In selected embodiments, the spoken audio content is applied to the cognitive audio classifier by applying the practical baseline Pi (P1, P2, ... Pn) to measure a quality of the spoken audio.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of classifying spoken audio content, the method comprising:
   receiving, by the information handling system, a baseline audio resource and associated transcript;
   applying, by the information handling system, a set of audio distortion effects AEj (AE1, AE2, ... AEk) to the baseline audio resource to generate a set of distorted audio resources;
   applying, by the information handling system, each distorted audio resource through a set of speech-to-text models STTi (STT1, STT2, ... STTn) to get an interference coherence score for each speech-to-text model STTi based on the transcript as a practical baseline Pi (P1, P2, ... Pn) that is associated with a coherence matrix for the audio effects AEj (AE1, AE2, ... AEk) that were used to generate the distorted audio resources;
   generating, by the information handling system, training data from the practical baseline Pi (P1, P2, ... Pn) for use in training a cognitive audio classifier; and
   applying, by the information handling system, spoken audio content to the cognitive audio classifier to measure a quality of detected vocabulary elements from the spoken audio content under the set of audio distortion effects for each speech-to-text model STTi.

2. The method of claim 1, further comprising processing the baseline audio resource and spoken audio content to extract audio features and metadata.

3. The method of claim 1, where applying each distorted audio resource comprises processing, by the information handling system, outputs from the set of speech-to-text models STTi (STT1, STT2, ... STTn) with a discourse analysis model to get the interference coherence score for each speech-to-text model STTi as the practical baseline Pi (P1, P2, ... Pn).

4. The method of claim 1, where training the cognitive audio classifier comprises training a long short-term memory (LSTM) neural network classifier with the practical baseline Pi (P1, P2, ... Pn) from the set of distorted audio resources which have a common quality level.

5. The method of claim 4, where the common quality level is a human labeled noise level for each distorted audio resource.

6. The method of claim 4, where training the cognitive audio classifier comprises training a deep learning service by ranking outcomes of speech-to-text models STTi using the interference coherence scores generated from the set of distorted audio resources.

7. The method of claim 1, where applying spoken audio content to the cognitive audio classifier comprises applying the practical baseline Pi (P1, P2, ... Pn) to measure a quality of the spoken audio.

8. An information handling system comprising:
   one or more processors;
   a memory coupled to at least one of the processors;

a set of instructions stored in the memory and executed by at least one of the processors to classify audio content, wherein the set of instructions are executable to perform actions of:

receiving, by the system, a baseline audio resource and associated transcript;

applying, by the system, a set of audio distortion effects AEj (AE1, AE2, . . . AEk) to the baseline audio resource to generate a set of distorted audio resources;

applying, by the system, each distorted audio resource through a set of speech-to-text models STTi (STT1, STT2, STTn) to get an interference coherence score for each speech-to-text model STTi based on the transcript as a practical baseline Pi (P1, P2, . . . Pn) that is associated with a coherence matrix for the audio effects AEj (AE1, AE2, . . . AEk) that were used to generate the distorted audio resources;

generating, by the system, training data from the practical baseline Pi (P1, P2, . . . Pn) for use in training a cognitive audio classifier; and applying, by the system, audio content to the cognitive audio classifier to measure a quality of detected vocabulary elements from the audio content under the set of audio distortion effects for each speech-to-text model STTi.

9. The information handling system of claim 8, wherein the set of instructions are executable to process the baseline audio resource and audio content to extract audio features and metadata.

10. The information handling system of claim 8, wherein the set of instructions are executable to apply each distorted audio resource by processing outputs from the set of speech-to-text models STTi (STT1, STT2, . . . STTn) with a discourse analysis model to get the interference coherence score for each speech-to-text model STTi as the practical baseline Pi (P1, P2, . . . Pn).

11. The information handling system of claim 8, wherein the set of instructions are executable to train the cognitive audio classifier by training a long short-term memory (LSTM) neural network classifier with the practical baseline Pi (P1, P2, . . . Pn) from the set of distorted audio resources which have a common quality level.

12. The information handling system of claim 11, where the common quality level is a human labeled noise level for each distorted audio resource.

13. The information handling system of claim 11, wherein the set of instructions are executable to train the cognitive audio classifier by training a deep learning service by ranking outcomes of speech-to-text models STTi using the interference coherence scores generated from the set of distorted audio resources.

14. The information handling system of claim 11, wherein the set of instructions are executable to apply audio content to the cognitive audio classifier by applying the practical baseline Pi (P1, P2, . . . Pn) to measure a quality of the audio content.

15. A non-transitory computer program product stored in a computer readable storage medium, comprising computer instructions that, when executed by a processor at an information handling system, causes the system to classify spoken audio content by:

receiving, by the system, a baseline audio resource and associated transcript;

applying, by the system, a set of audio distortion effects AEj (AE1, AE2, . . . AEk) to the baseline audio resource to generate a set of distorted audio resources;

applying, by the system, each distorted audio resource through a set of speech-to-text models STTi (STT1, STT2, . . . STTn) to get an interference coherence score for each speech-to-text model STTi based on the transcript as a practical baseline Pi (P1, P2, . . . Pn) that is associated with a coherence matrix for the audio effects AEj (AE1, AE2, . . . AEk) that were used to generate the distorted audio resources;

generating, by the system, training data from the practical baseline Pi (P1, P2, . . . Pn) for use in training a cognitive audio classifier; and applying, by the system, spoken audio content to the cognitive audio classifier to measure a quality of detected vocabulary elements from the spoken audio content under the set of audio distortion effects for each speech-to-text model STTi.

16. The non-transitory computer program product of claim 15, further comprising computer instructions that, when executed by the system, causes the system to process the baseline audio resource and spoken audio content to extract audio features and metadata.

17. The non-transitory computer program product of claim 15, further comprising computer instructions that, when executed by the system, causes the system to apply each distorted audio resource by processing outputs from the set of speech-to-text models STTi (STT1, STT2, . . . STTn) with a discourse analysis model to get the interference coherence score for each speech-to-text model STTi as the practical baseline Pi (P1, P2, . . . Pn).

18. The non-transitory computer program product of claim 15, further comprising computer instructions that, when executed by the system, causes the system to train the cognitive audio classifier by training a long short-term memory (LSTM) neural network classifier with the practical baseline Pi (P1, P2, . . . Pn) from the set of distorted audio resources which have a common quality level.

19. The non-transitory computer program product of claim 15, further comprising computer instructions that, when executed by the system, causes the system to train the cognitive audio classifier by training a deep learning service by ranking outcomes of speech-to-text models STTi using the interference coherence scores generated from the set of distorted audio resources.

20. The non-transitory computer program product of claim 15, further comprising computer instructions that, when executed by the system, causes the system to apply spoken audio content to the cognitive audio classifier by applying the practical baseline Pi (P1, P2, . . . Pn) to measure a quality of the spoken audio.

\* \* \* \* \*